United States Patent [19]
Hoshino

[11] Patent Number: 5,208,412
[45] Date of Patent: May 4, 1993

[54] ROTATION RESISTANCE DEVICE FOR A BOLT OF A TIGHTENING DEVICE OF A DRUM HEAD

[75] Inventor: Yoshihiro Hoshino, Nagoya, Japan

[73] Assignee: Hoshino Gakki Co., Ltd., Japan

[21] Appl. No.: 740,958

[22] Filed: Aug. 6, 1991

[30] Foreign Application Priority Data
Jan. 19, 1991 [JP] Japan .................. 3-006754[U]

[51] Int. Cl.⁵ ............................................. G10D 13/02
[52] U.S. Cl. ................................. 84/413; 84/411 R
[58] Field of Search ............................. 84/413, 411 R

[56] References Cited

U.S. PATENT DOCUMENTS

| | | | |
|---|---|---|---|
| 4,122,747 | 10/1978 | Yamashita | 84/413 |
| 4,790,229 | 12/1988 | Hoshino | 84/413 |
| 4,870,883 | 10/1989 | Gauger | 84/413 |

FOREIGN PATENT DOCUMENTS

| | | |
|---|---|---|
| 0143191 | 6/1985 | European Pat. Off. . |
| 253724 | 12/1911 | Fed. Rep. of Germany . |
| 2813883 | 10/1979 | Fed. Rep. of Germany . |

OTHER PUBLICATIONS
Machine Design, "Threaded Fasteness", Nov. 19, 1987, pp. 56–68.

Primary Examiner—William M. Shoop, Jr.
Assistant Examiner—Helen Kim
Attorney, Agent, or Firm—Ostrolenk, Faber, Gerb & Soffen

[57] ABSTRACT

A drum head is held over the open end of a drum body by a drum hoop passing around the edge of the drum head. A lug on the side of the drum body has an axial opening which receives a lug nut. The lug nut has an axial threaded opening. A threaded bolt, which engages the drum head hoop, is tightened into the threaded opening of the lug nut and draws the drum hoop to tighten the drum head. A radial opening extends radially through the lug nut from the opening in the lug to the threaded opening for the bolt. An elastic bolt engaging and bolt rotation resisting chip in the radial opening engages the lug on the outside and the bolt in the lug nut opening for restraining rotation of the bolt. There may be a drum head at each end of the drum body, a respective lug near each drum head and a single element defining both lug nuts.

12 Claims, 5 Drawing Sheets

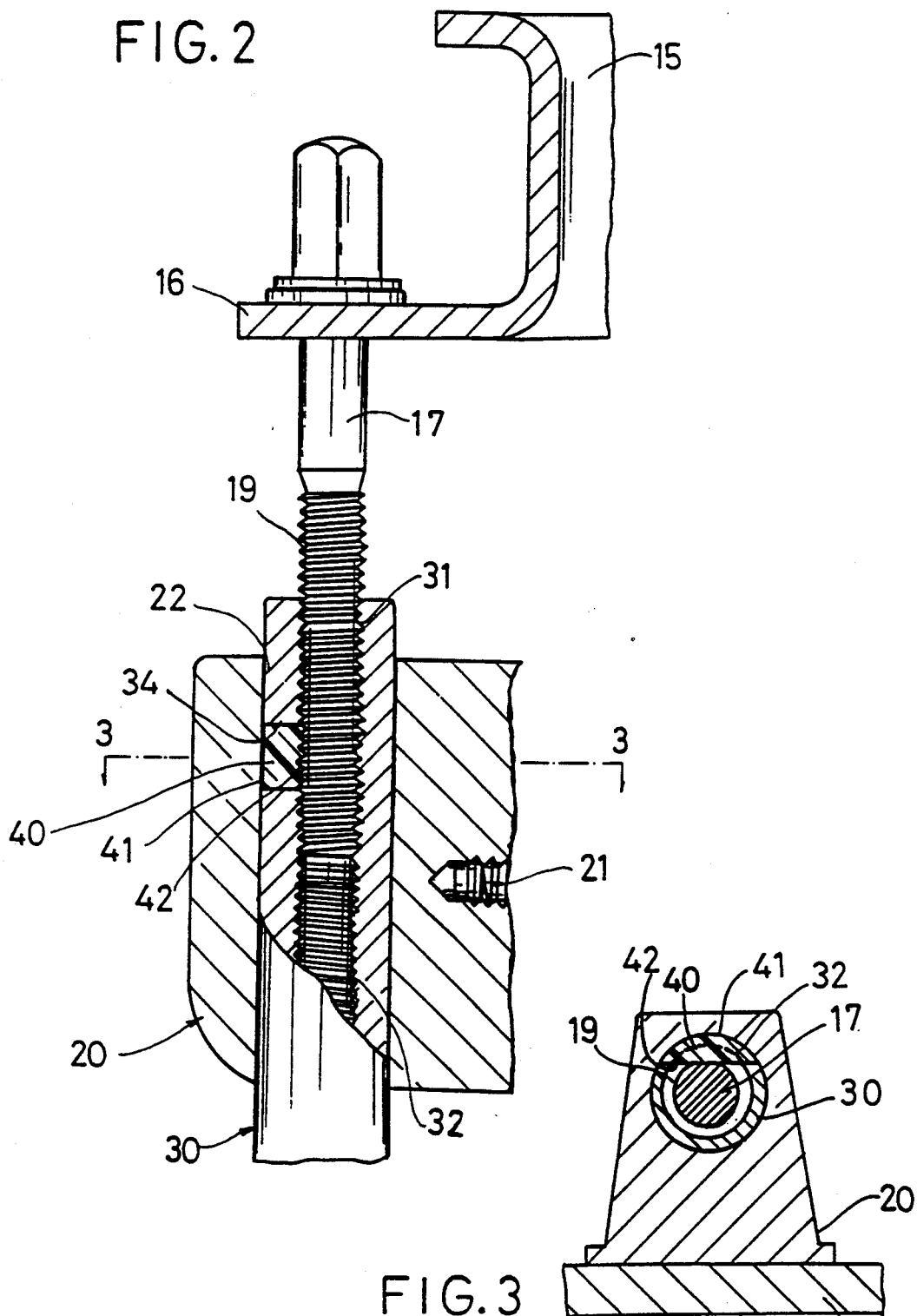

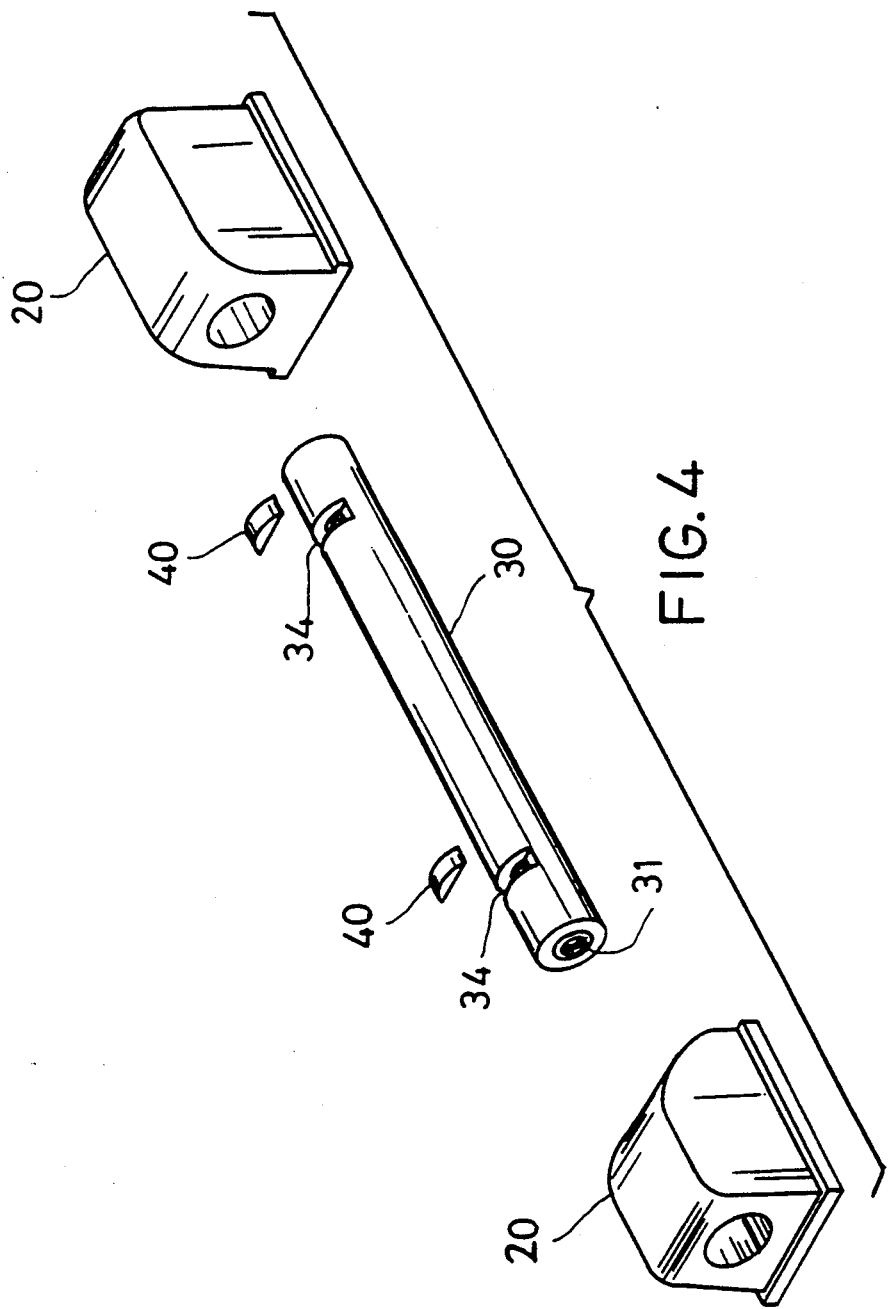

ROTATION RESISTANCE DEVICE FOR A BOLT OF A TIGHTENING DEVICE OF A DRUM HEAD

BACKGROUND OF THE INVENTION

This invention relates to a device for preventing a tightened drum head fixing bolt from being loosened.

A drum head is provided at the upper and/or lower end of the drum body of a percussion musical instrument drum. A drum head fixing hoop is provided around the outer peripheral part of the drum head. The hoop on one end of the drum body is compressively tightened toward the other end of the drum body by screwing a bolt that engages the hoop into a lug nut which is supported on a lug that is fixed to the drum body and this fixes the drum head to the drum body and tensions the drum head.

The bolt fixes the drum head to the drum body and adjusts the tension of the drum head to tune its sound. However, the tightening bolt can be loosened by the vibration of the beating of the drum head for a long period of time. This will change the tension adjustment of the drum head.

SUMMARY OF THE INVENTION

The invention solves the above problem. It offers a tightening and fixing device for the drum head which prevents the drum head tension setting and adjusting bolt between the drum hoop and the lug nut from being loosened.

The tightening and fixing device fixes a drum head to the end of the drum body by compressively tightening the drum hoop around the drum head. This compressive tightening is done by screwing a tension setting and adjusting bolt into a lug nut supported on the drum body. A respective lug is attached to the drum body near each drum head. A lug nut is supported on, and particularly in a bore in, each lug. A common lug nut may extend to the lugs near each drum head. Each lug nut has an axial, screw threaded, bolt receiving opening into it for receiving the drum head tension adjusting bolt for the drum hoop of the respective drum head.

A radial opening passes through the lug nut from the exterior thereof, which lug nut exterior is at an interior surface of the lug, to the interior of the lug nut at the bolt receiving opening into the lug nut. The radial opening has an axial height extending at least to two pitches, or more, of the screw thread in the lug nut.

A bolt rotation resisting chip, comprised of an elastic body is installed in the radial opening. The chip has a radially inner surface that extends into the bolt receiving opening of the lug nut and frictionally engages the drum head tension adjusting bolt in the opening and has a radially outer surface that frictionally engages the interior surface of the lug in which the lug nut at its radial opening are installed. Undesired rotation of the drum head tension adjusting bolt, e.g., during drum beating, is resisted.

Other objects and features of the invention are described with reference to the accompanying drawings.

BRIEF DESCRIPTION OF THE DRAWINGS

FIG. 2 is a fragment of and an expanded cross section of FIG. 1;

FIG. 3 is a cross section along the line 3—3 in FIG. 2;

FIG. 4 is an exploded perspective view of the tightening and fixing device shown in FIG. 1;

DESCRIPTION OF THE PREFERRED EMBODIMENTS

Figure 1:
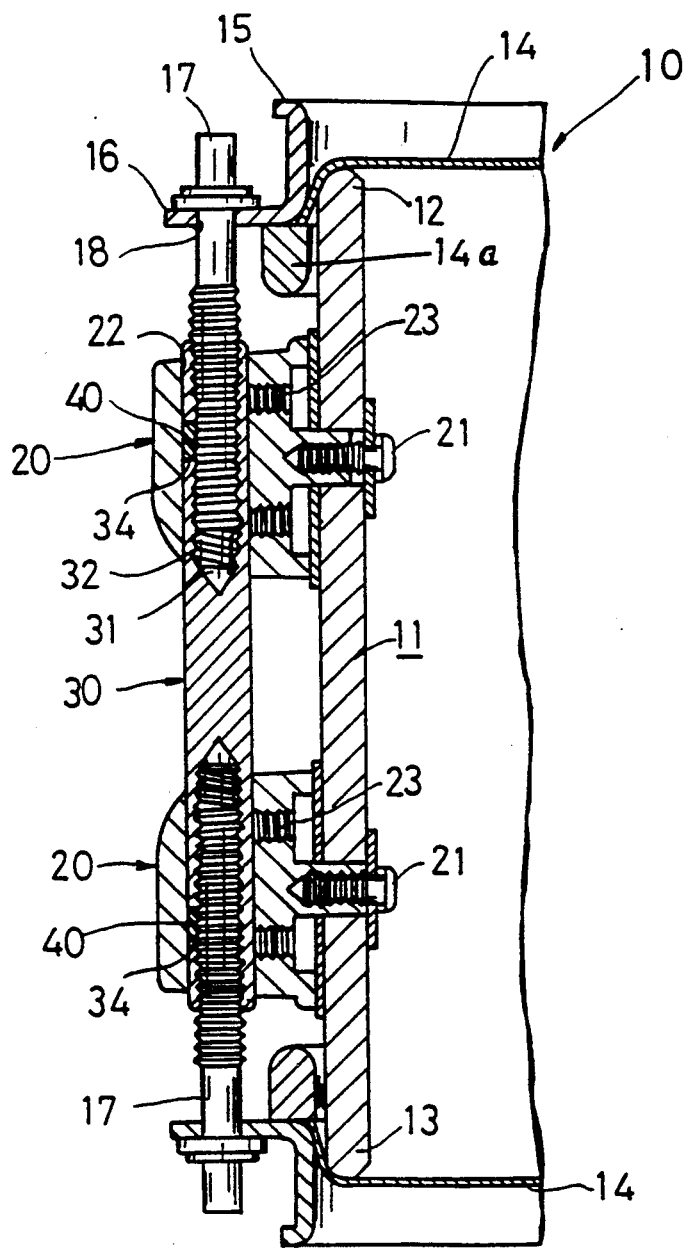
FIG. 1 is a partial cross section of a drum showing a tightening and fixing device for the drum head.

As is shown in FIGS. 1 and 2, the drum 10 has a cylindrical drum body 11 with opposite top and bottom ends, a top drum head 14 provided on the top end or the beating surface 12 of the drum body 11 and a bottom drum head on the bottom end or beating surface 13 of the drum body. A drum head tightening hoop 15 is installed around the outer peripheral part of the drum head 14. The drum head 14 terminates in a stiff peripheral rim 14a which the hoop 15 is axially above and against which the hoop presses axially.

A respective lug 20 is fixed on the outside peripheral surface or side of the drum body, located axially toward each drum head. A lug fixing bolt 21 extends from inside the drum trunk 11 into each lug. The two lugs 20 are axially and circumferentially aligned on the drum body. Each lug 20 has a respective axial through hole 22. The holes 22 are aligned. A common lug nut 30 passes through both lug holes 22. The lug nut 30 is held in place in the lugs by one or more stop screws 23 between the lug and the lug nut.

The drum head 14 is fixed to the drum body 11 by a drum head tension setting and adjusting bolt 17 that is inserted into and extends through a tightening hole 18 which is provided at a flange 16 of the tightening hoop 15. The bolt 17 fixes the drum hoop to the lug nut 30 and adjusts the tension on the drum head.

The lug nut 30 has an axial bolt receiving opening 31 into each axial end and at least toward the bottom or inward end of each opening 31, the opening 31 has a screw thread 32 for screw threadedly receiving the bolt 17 inside the lug nut.

The lug nut has a radial opening 34 through it along the side of the bolt receiving opening 31 in the lug nut. The radial opening 34 extends axially along the lug nut over at least two pitches of the screw thread 32.

A bolt rotation resisting and drum head tension holding chip 40 is inserted into the radial opening 34. The chip 40 is comprised of an elastic body formed, for example, of rubber or plastic. The radially inner side 42 of the chip protrudes into the screw groove 32 of the screw opening 31 and presses against the outside of the bolt 17 within the lug nut opening 31. As shown in FIGS. 2 and 3, the radially outer side 41 of the chip 40 presses against the inner surface of the bore of the lug 20 in which the lug nut is disposed. Because the bolt rotation resisting chip 40 is an elastic body, during rotation of the bolt 17 for screwing it into the screw opening 31, the crests 19 of the threads of the bolt 17 bite into the inner side 42 of the chip 40. Because the outer side 41 of the chip 40 is also in contact with the inner surface of the bore of the lug 20, the bolt 17 is firmly fixed, which reliably prevents loosening the bolt. Because the bolt 17 bites into the chip 40 over at least two pitches of the screw crests 19, loosening of the bolt is reliably prevented.

An exploded perspective view of the tightening and fixing device with its chips 40 is shown in FIG. 4.

Figure 5:
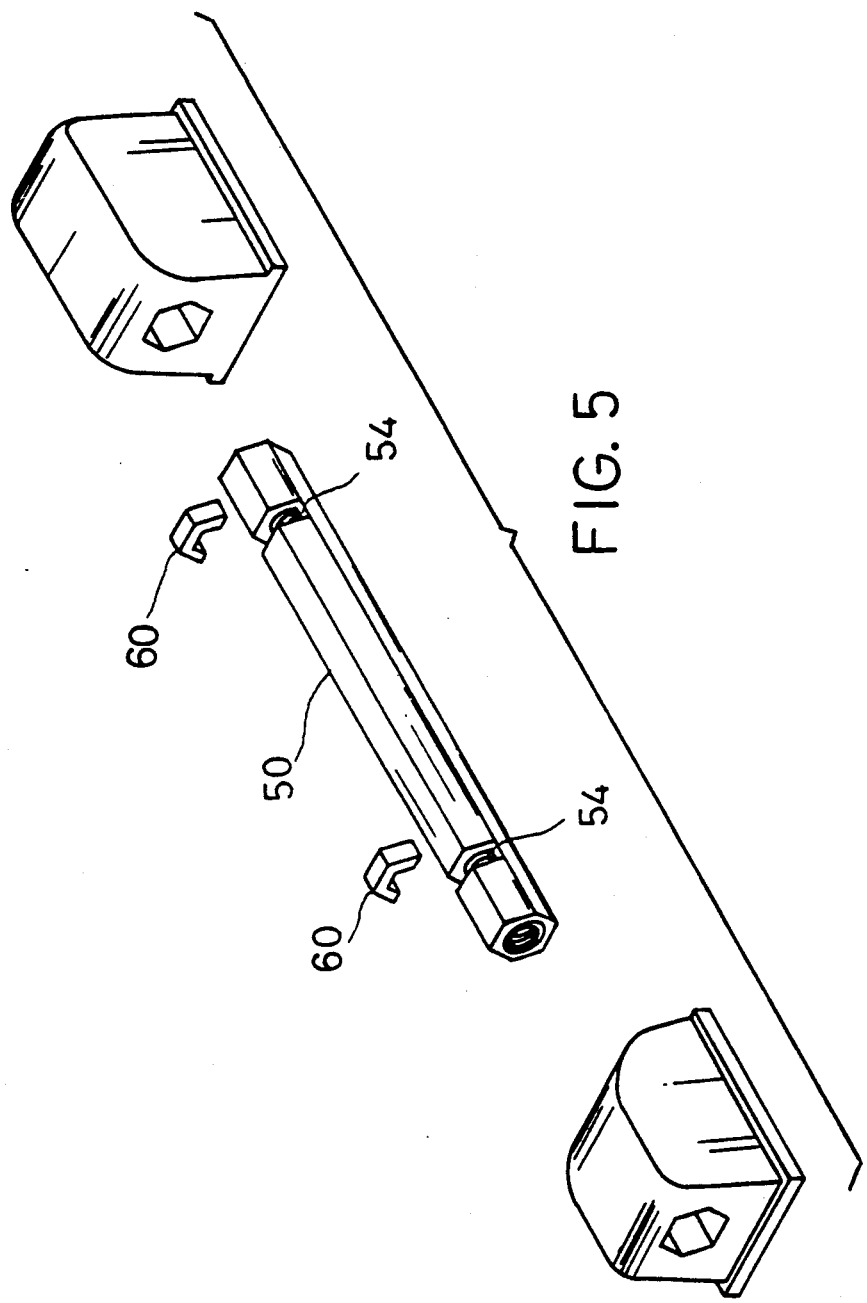
FIG. 5 is an exploded perspective view of a second embodiment.

FIG. 5 shows an example of a lug nut 50 that has been formed in a hexagonal shape periphery rather than the circular shape periphery of the lug nut 30. The radial opening 54 through the side of the lug nut 50 receives the correspondingly externally profiled bolt rotation resisting chip 60 which acts like chip 40.

Figure 6:
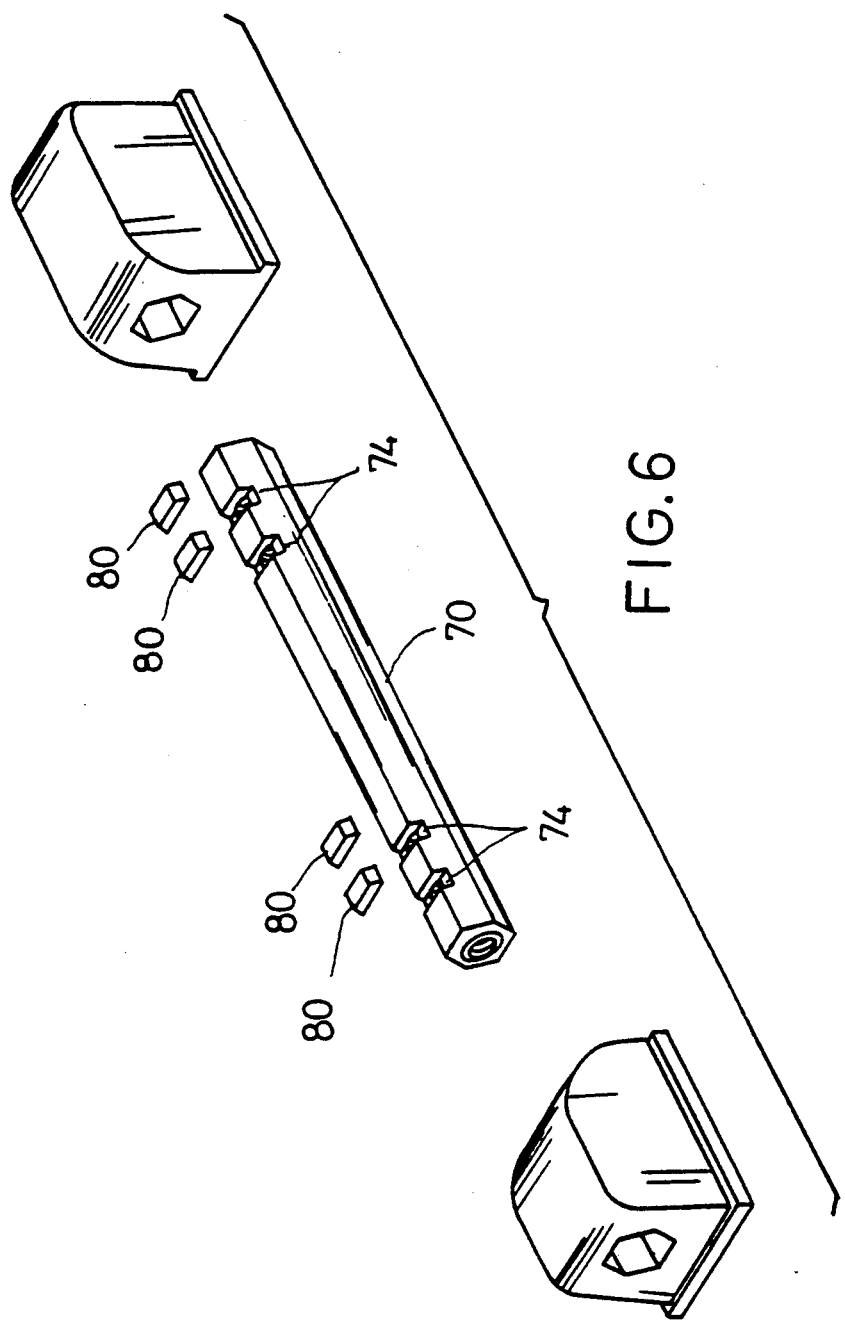
FIG. 6 is an exploded perspective view of a third embodiment.

FIG. 6 shows an example of a lug nut 70 that has two axially spaced radial openings 74 along each bolt receiving opening in the lug nut. A respective bolt rotation resisting chip 80 that acts like chip 40 is received in each radial opening 74.

As has been explained above, a radial opening extends axially over at least two pitches of the screw groove in the lug nut that receives the drum head tension adjusting bolt. A bolt rotation resisting chip comprised of an elastic body has an inner side that protrudes into the screw opening of the lug nut. The outer side of the chip is in contact with the inner surface of the lug. Upon tightening of the drum head tension adjusting bolt, the chip bites into the screw crests of the bolt and the chip is also in close contact with the inner surface of the lug, thereby firmly fixing the bolt against rotation. This reliably prevents the drum head tension adjusting bolt from being loosened even by the violent vibrations experienced during a drum performance for a long period of time, thereby making it possible to carry out a stable musical performance.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A device for tightening a drum head and setting the tension of the drum head on a drum body, the device comprising:
   a drum body having an open end over which a drum head is to be placed;
   a drum hoop supported on the drum body at the open end and movable along the drum body to pass the open end, the hoop including means for engaging a drum head at the drum body open end for tightening the drum head as the drum hoop is moved a short distance along the drum body;
   a lug secured to the drum body, the lug having an opening therein generally in the direction along the drum trunk;
   a lug nut in the lug opening, the lug nut having an external periphery in the opening in the lug, means holding the lug nut in place to the lug, the lug nut having a bolt receiving opening therein, the bolt receiving open being at least partially screw threaded, the bolt receiving opening extending generally along the drum body and away from the open end;
   a drum head tension setting and adjusting bolt, the bolt including means for engaging the drum hoop at the open end of the drum body for holding the drum hoop to the drum body, the bolt having a shank which is cooperatingly screw threaded to the threaded part of the opening in the lug nut, and the bolt being tightenable into the bolt receiving opening of the lug nut, the tightening of the bolt moving the means engaging the drum hoop for moving the hoop to tension and fix the drum head to the drum body over the open end of the drum body;
   a radial opening through the lug nut from the periphery of the lug nut to the bolt receiving opening;
   a bolt rotation resisting chip comprised of an elastic body and disposed in the radial opening in the lug nut, the chip including a radially outer side, which contacts the lug at the inside of the lug opening, the chip including a radially inner side which directly engages the shank of the bolt in the bolt receiving opening in the lug nut for resisting the rotation of the bolt in the bolt receiving opening.

2. The device of claim 1, wherein the radial opening in the lug nut and the chip both have a length along the lug nut that is at least two pitches of the screw thread of the bolt.

3. The device of claim 2, wherein the radial opening is so placed on the lug nut and the threaded part of the bolt receiving opening is so placed that the chip engages the threaded section of the shank portion of the bolt.

4. The device of claim 1, wherein the means for holding the lug nut in the lug opening comprises means for fixedly clamping the lug nut in the lug opening.

5. The device of claim 1 further comprising a drum head at the end of the drum body;
   the hoop on the drum body being positioned for engaging the drum head and for clamping the drum head over the open end of the drum body;
   as the drum head tension adjusting bolt engages the drum hoop and is tightened into the lug nut, that draws the drum hoop onto the drum body and tightens the drum head.

6. The device of claim 1, wherein the drum body has opposite open ends;
   a respective one of the lugs being affixed to the drum body toward each end of the drum body;
   the lug nut comprising a single element which extends between and into the respective lug openings of both of the lugs;
   the respective bolt receiving opening in the lug nut for each bolt opens outward from the respective opposite end of the lug nut and toward the respective drum head at the respective end of the drum body.

7. The device of claim 6 further comprising a respective drum head over each open end of the drum body;
   a respective one of the hoops on the drum body being positioned for engaging each of the drum heads and for clamping the respective drum head over the respective open end of the drum body;
   as the drum head tension adjusting bolt engages the respective drum hoop for each drum head and is tightened into the respective lug nut, that draws the respective drum hoop onto the drum body and tightens the respective drum head.

8. The device of claim 1, wherein the lug nut has a circular periphery and the opening in the lug is correspondingly circularly shaped.

9. The device of claim 1, wherein the lug nut has a polygonal shape periphery and the opening in the lug is correspondingly shaped.

10. The device of claim 9, wherein the polygonal shape of the periphery of the lug nut and of the opening in the lug is hexagonal.

11. The device of claim 1, wherein there are two of the radial openings in the lug nut, the radial openings being axially spaced apart along the length of the bolt receiving opening, and
   a respective chip in each of the radial openings, with each of the chips engaging the interior of the lug and the shank portion of the bolt.

12. The device of claim 1, wherein the radial opening is so placed on the lug nut and the threaded part of the bolt receiving opening is so placed that the chip engages the threaded section of the shank portion of the bolt.

* * * * *